(12) United States Patent
Thetford et al.

(10) Patent No.: US 8,778,218 B2
(45) Date of Patent: Jul. 15, 2014

(54) DISPERSANT COMPOSITION

(75) Inventors: Dean Thetford, Norden (GB); Patrick J. Sunderland, Rossendale (GB)

(73) Assignee: Lubrizol Limited, Blackley, Manchester (GB)

( * ) Notice: Subject to any disclaimer, the term of this patent is extended or adjusted under 35 U.S.C. 154(b) by 542 days.

(21) Appl. No.: 12/532,442

(22) PCT Filed: Mar. 28, 2008

(86) PCT No.: PCT/EP2008/053727
§ 371 (c)(1),
(2), (4) Date: Sep. 22, 2009

(87) PCT Pub. No.: WO2008/116934
PCT Pub. Date: Oct. 2, 2008

(65) Prior Publication Data
US 2010/0084601 A1    Apr. 8, 2010

Related U.S. Application Data

(60) Provisional application No. 60/908,432, filed on Mar. 28, 2007.

(51) Int. Cl.
C09K 3/00      (2006.01)
C07F 9/02      (2006.01)
C07C 381/00    (2006.01)

(52) U.S. Cl.
USPC ........................................ 252/182.3; 560/149

(58) Field of Classification Search
USPC ....................................................... 252/182.3
See application file for complete search history.

(56) References Cited

U.S. PATENT DOCUMENTS 5,914,072 A * 6/1999 Zirnstein et al. ................. 516/57
5,981,624 A * 11/1999 Thetford et al. ............... 523/160

FOREIGN PATENT DOCUMENTS

| DE | 19529242 A1 | 2/1997 |
| EP | 1 611 943 A2 | 1/2006 |
| WO | 01/80987 A2 | 11/2001 |
| WO | 02/085507 A2 | 10/2002 |

* cited by examiner

*Primary Examiner* — Harold Pyon
*Assistant Examiner* — Katie L Hammer
(74) *Attorney, Agent, or Firm* — Michael F. Esposito, Esq.; David M. Shold, Esq.

(57) ABSTRACT

The invention relates to a composition containing a particulate solid, an organic or aqueous medium, and a compound with a head group derived from phosphoric acid or sulphuric acid. The invention further relates to novel compounds, and the use of the compound as a dispersant.

13 Claims, No Drawings

DISPERSANT COMPOSITION

CROSS REFERENCE TO RELATED APPLICATION

This application claims priority from PCT Application Serial No. PCT/EP2008/53727 filed on Mar. 28, 2008, which claims the benefit of U.S. Provisional Application No. 60/908,432 filed on Mar. 28, 2007.

FIELD OF INVENTION

The invention relates to a composition containing a particulate solid, an organic or aqueous medium, and a compound with a head group derived from phosphoric acid or sulphuric acid. The invention further relates to novel compounds, and the use of the compound as a dispersant.

BACKGROUND OF THE INVENTION

Dispersants containing terminal acidic groups such as phosphates and sulphates are known and are generally prepared by reaction of a hydroxy ended polymer chain with a phosphorylating agent such as phosphorus pentoxide, phosphorus oxychloride, phosphorus trichloride and pentachloride, polyphosphoric acid or sulphuric acid, respectively. The polymer chains are usually polyester or polyalkoxylate chains containing terminal hydroxyl groups.

U.S. Pat. No. 5,300,255 discloses dispersants containing a polyester derived from a hydroxycarboxylic acid with not more than 8 carbon atoms reacted with phosphorus pentoxide or sulphuric acid. The dispersants are useful in non-polar media, such as aromatic solvents and plastics.

U.S. Pat. No. 5,130,463 discloses dispersants containing a polyether/polyester derived from ε-caprolactone reacted with polyphosphoric acid. The dispersants are useful in a polar medium, such as ketones and esters.

U.S. Pat. No. 6,051,627 discloses dispersants including a polyether derived from ethylene oxide and propylene oxide reacted with polyphosphoric acid. The dispersants are useful in a polar medium such as ketones, esters and water.

U.S. Pat. Nos. 5,464,895 and 5,412,139 both disclose polyaryl organophosphate dispersing agents.

U.S. Pat. Nos. 2,213,477; 2,454,542; 3,004,056; 3,235,627; 4,720,514; 4,872,916; and 5,914,072 all disclose polyalkoxylates containing terminal hydroxyl groups that have been reacted with various phosphorylating agents.

International Patent Application WO 05/085261 discloses phosphated dispersants comprising a polyether/polyester chains reacted with a hydroxy di-, tri- or multi-carboxylic acid.

However, it would be advantageous to utilize the dispersant properties of compounds containing terminal acidic groups in both a polar and a non-polar organic medium. Consequently, dispersants are sought which can disperse a particulate solid in both a polar and a non-polar organic medium.

SUMMARY OF THE INVENTION

In one embodiment, the invention provides a compound of Formula (1) (typically a mono-ester) and salts thereof:

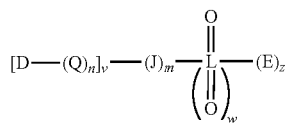

Formula (1)

wherein when L is sulphur, w is 1 and z is 1; or when L is phosphorus, w is 0 and z is 2;

E is —OH, or an oxygen anion when the compound of Formula (1) is a salt;

Q is a repeat unit derived from an aminocarboxylic acid, or a hydroxycarboxylic acid, or a lactone, a residue of a dicarboxylic acid and diol, or mixtures thereof;

m is 0 or 1, with the proviso that when m is 0, v is 1, and Q is linked via an oxygen from a hydroxy group to L, and via a carboxylic group to D; and when m is 1, v is 1 to 4;

J is a mono-, di-, tri- or poly-hydroxy di-, tri- or poly-carboxylic acid residue, with the proviso that J is linked via a carboxylic group to Q and via an oxygen derived from a hydroxy group to L when m is 1;

D is a residue of an amine selected from the group consisting of a mono-amino residue represented by the general formula R—O—$(Y)_x$-T-N(G)-, a diamino group represented by the general formula R'—N(G')-T-O—$(Y)_x$-T-N(G)- and mixtures thereof;

n is 0 or 100, or 1 to 100, 1 to 50, or 0 to 2;

R and R' are independently H or $C_{1-50}$-optionally substituted hydrocarbyl, or $C_{1-50}$-optionally substituted hydrocarbonyl, or the residue of an epoxide;

Y is an alkyleneoxy group such as $C_{2-4}$-alkyleneoxy;

T is an alkylene group such as $C_{2-4}$ alkylene;

G and G' are independently H or $C_{1-50}$-optionally substituted hydrocarbyl or $C_{1-50}$-optionally substituted hydrocarbonyl; and x is 2 to 90.

In one embodiment, the invention provides a composition comprising a particulate solid, an organic or aqueous medium and a compound of Formula (1) and salts thereof as defined above.

In one embodiment, the invention provides a composition comprising a particulate solid, an organic or aqueous medium and a compound obtained/obtainable by reacting:

(a) a phosphorylating agent (such as phosphorus pentoxide, phosphorus oxychloride, phosphorus trichloride and pentachloride, or polyphosphoric acid), or a sulphating agent (such as sulphuric acid, sulphur trioxide (optionally in the presence of hydrogen chloride or a complexing agent e.g., dioxane), chlorosulphonic acid, sulphuryl chloride, or sulphur dioxide in combination with an oxidizing agent e.g., oxygen or chlorine);

(b) at least one member of the group consisting of an amino carboxylic acid, a hydroxycarboxylic acid, a lactone, and a mono-, di-, tri- or polyhydroxy di-, tri- or poly-carboxylic acid; and (c) an amine, wherein the amine has a functional group selected from the group consisting of (i) a mono-amino group represented by the general formula R—O—$(Y)_x$-T-N(G)-, (ii) a diamino group represented by the general formula R'—N(G')-T-O—$(Y)_x$-T-N(G)-, and mixtures thereof.

In one embodiment, the invention provides a composition comprising a particulate solid, an organic medium and a compound of Formula (1a) and salts thereof:

Formula (1a)

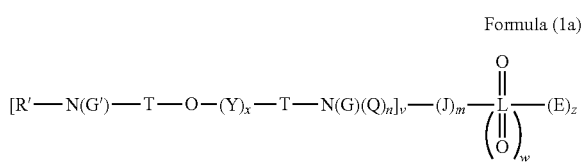

wherein L, z, E, R', T, Y, x, G', G, Q, n, v, J and m are as described above; and wherein G and G' may be the same or different.

In one embodiment, the invention provides a composition comprising a particulate solid, an organic medium and a compound of Formula (1b) and salts thereof:

Formula (1b)

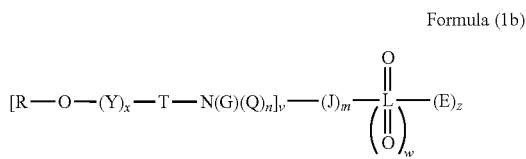

wherein L, z, E, R, T, Y, x, G, Q, n, v, J and m are as described above.

In one embodiment, the invention provides for the use of the compound of Formulae (1), (1a) and (1b) as a dispersant.

In one embodiment, the invention provides for the use of the compound of Formula (1), (1a) and (1b) as a dispersant in the composition disclosed herein.

DETAILED DESCRIPTION OF THE INVENTION

The present invention provides a composition as disclosed herein above.

When some or all of R or R' are hydrocarbyl groups, the number of carbon atoms on each hydrocarbyl group may be in the range of 1 to 36, or from 1 to 20.

In one embodiment, R or R' are hydrocarbyl groups including aryl, aralkyl, alkaryl, cycloalkyl or alkyl, which may be linear or branched. In one embodiment, the hydrocarbyl group is substituted. In another embodiment, the hydrocarbyl group is unsubstituted.

In one embodiment, R or R' are aryl. Examples of a suitable aryl group include naphthyl, phenyl, or styrenated phenyl.

In one embodiment, R or R' are aralkyl. Examples of a suitable aralkyl group include 2-phenylethyl or benzyl.

In one embodiment, R or R' are alkaryl. Examples of a suitable alkaryl group include octyl phenyl or nonyl phenyl.

In one embodiment, R or R' are cycloalkyl. Examples of a suitable cycloalkyl group include a $C_{3-8}$-cycloalkyl, such as, cyclopropyl or cyclohexyl.

R' may be defined the same or different to R with regard to the number of carbon atoms present on a hydrocarbyl, alkyl group, etc.

In one embodiment, at least one of R, R', G, or G' includes the residue of an optionally substituted (meth) acrylic ester or amide group, a haloacetic acid, or mixtures thereof. In one embodiment, R' or R includes the residue of an alkyl (meth) acrylate, or mixtures thereof. In one embodiment, G or G' includes the residue of a halo acetic acid. In one embodiment, G or G' includes the residue of an alkyl (meth)acrylate, or mixtures thereof.

As used herein the term (meth)acryl means acrylic or methacrylic units.

In one embodiment, R is an optionally branched alkyl, such as a $C_{1-36}$ optionally branched alkyl. The group R—O— may thus be the residue of an alcohol such as methanol, ethanol, n-propanol, n-butanol, n-hexanol, n-octanol, n-decanol, n-dodecanol, n-tetradecanol, n-hexadecanol, n-octadecanol, isopropanol, isobutanol, tert-butanol, 2-ethylbutanol, 2-ethylhexanol, 3-heptanol, 3,5,5-trimethylhexanol, 3,7-dimethyloctanol and the so-called Guerbet alcohols such as those which are commercially available under the trade name Isofol (ex Condea GmbH), other branched alcohols commercially available under the trade name Softanol (ex Nippon Shokubai), or mixtures thereof. Specific examples of Guerbet alcohols are Isofol 12, 14E, 14T, 16, 18T, 18E, 20, 24, 28, 32, 32T and 36.

R in other embodiments may be $C_{1-6}$-alkyl, $C_{1-4}$-alkyl, or methyl.

When R is substituted hydrocarbyl, the substituent may be $C_{1-10}$-alkoxy, acyl, sulphonyl, carbamoyl, sulphamoyl, halogen, nitrile, ureido-containing group, urethane-containing group, ester (i.e., R—COO— or R—OCO—), or aryl group.

When a portion of Y is $C_{3-4}$-alkyleneoxy, and the chain represented by $(Y)_x$ contains ethyleneoxy (—$CH_2CH_2O$—), the structure of $(Y)_x$ may be random or block. In one embodiment, structure of $(Y)_x$ is block.

The chain represented by $(Y)_x$ may contain only one type of $C_{3-4}$-alkyleneoxy repeat unit or it may contain two or more different $C_{3-4}$-alkyleneoxy repeat units. When the chain represented by $(Y)_x$ contains two or more different $C_{3-4}$-alkyleneoxy repeat units, the structure of $(Y)_x$ may be random or block.

In one embodiment, Y is a $C_{3-4}$-alkyleneoxy group, —$CH_2CH_2CH_2CH_2$— or —$CH_2CH(CH_3)CH_2O$— or —$CH_2CH(CH_3)O$—. In another embodiment, Y is a —$CH_2CH_2CH(CH_3)O$— or —$CH_2$—$CH(CH_2$—$CH_3)$—O—. In one embodiment, Y is $C_{3-4}$-alkyleneoxy and the chain represented by $(Y)_x$ is —$CH_2CH_2CH_2CH_2O$—, —$CH_2CH(CH_3)O$— or —$CH_2$—$CH(CH_2$—$CH_3)$—O—.

In one embodiment, the dispersant of Formula (1) includes $C_{3-4}$-alkyleneoxy (e.g., —$CH_3CH(CH_3)O$—) and may contain a portion of ethyleneoxy repeat units. The ethyleneoxy repeat units in different embodiments may be present on the chain represented by $(Y)_x$ up to a maximum of 45 wt % of the chain, or up to 35 wt % of the chain, or up to 30 wt % of the chain. In one embodiment, no ethyleneoxy repeat units are present on $(Y)_x$.

In other embodiments, the chain $(Y)_x$, may contain at least 50 wt. %, or at least 75 wt. % of ethyleneoxy repeat units when the compound is required for an aqueous medium, optionally further including polar organic liquids. In one embodiment, no propyleneoxy repeat units are present on $(Y)_x$.

In one embodiment, the compound of Formula (1) includes at least one Y group which is —$CH_2CH(CH_3)O$— and the chain represented by $(Y)_x$ may contain up to 45 mole % ethyleneoxy repeat units.

In one embodiment, the dispersant of Formula (1) includes at least one Y group which is —$CH_3CH(CH_3)O$— and the chain represented by $(Y)_x$ may contain up to 90 mole % ethyleneoxy repeat units.

In one embodiment, Y is a mixture of $C_{3-4}$-alkyleneoxy where the chain represented by $(Y)_x$ is in part —$CH_2CH_2CH_2CH_2O$—, —$CH_2CH(CH_3)O$— or —$CH_2$—$CH(CH_2$—$CH_3)$—O—, with up to 90 mole % ethyleneoxy groups present.

In one embodiment, the compound of Formula (1) contains a Y group of only ethyleneoxy repeat units and these may be used in an aqueous medium.

In different embodiments, T includes $C_{3-4}$-alkylene groups, or —$CH_2CH(CH_3)$— groups, or —$CH_2CH_2CH_2$— groups. In one embodiment, T includes —$CH_2CH(CH_3)$—. In one embodiment, T includes —$CH_2CH(CH_3)$—; and Y includes —$CH_2CH(CH_3)O$—.

In one embodiment, the Formula (1a) is derivable from the residue of the group R'—N(G')-T-O—$(Y)_x$-T-NG. The R'—N(G')-T-O—$(Y)_x$-T-NG- is typically the residue of a polyalkyleneoxide diamine. Compounds of this type are commercially available as the Jeffamine™ D or ED-series of diamines from Huntsman Corporation. Specific examples of Jeffamine™ diamines are D-230 (3,0,230), D-400 (6,0,400), D-2000 (33, 0,2000), D-4000 (68,0,4000), ED-600 (3.6,9,600), ED-900 (2.5,15.5,900) and ED2003 (6,39,2000). The figures in parentheses are approximate repeat units of propylene oxide, ethylene oxide and number-average molecular weight, respectively.

In one embodiment, the Formula (1b) is derivable from the residue of the group RO—$(Y)_x$-T-NG-. The group RO—$(Y)_x$-T-NG- typically is the residue of a polyalkyleneoxide monoalkyl ether monoamine. Compounds of this type are commercially available as the Jeffamine™ M-series of monoamines or Surfonamine™ amines, from Huntsman Corporation. Specific examples of Jeffamine™ amines include M-600 (9,0,600), M-1000 (3,18,1000), M-2005 (32, 2,2000), M-2070 (10, 31, 2000) and XTJ-234 (8,49,3000). Specific examples of Surfonamine™ amines include B-60 (9,1,600), B-100, B-200 (29,6,2000), L-100 (3,19,1000), L-200 (4,41,2000), L-207 (10,33,2000), and L-300 (8,58, 3000). The figures in parentheses are approximate repeat units of propylene oxide, ethylene oxide and number-average molecular weight, respectively.

In one embodiment, Q includes a residue of an amino carboxylic acid, or mixtures thereof. The amino carboxylic acid includes amino-$C_{2-20}$-alkenylene carboxylic acid or amino-$C_{1-20}$-alkylene carboxylic acid. The alk(en)ylene group may be linear or branched. In one embodiment, the alk(en)ylene group of the amino carboxylic acid contains not greater than 12 carbon atoms. Specific examples include glycine, 11-amino undecanoic acid, 6-amino caproic acid, 4-aminobutyric acid, β-alanine and sarcosine. Mixtures of amino carboxylic acids may be used.

In one embodiment, Q is a repeat unit derived from a hydroxycarboxylic acid, or a lactone, or mixtures thereof.

The lactone may include a β-propiolactone, a ε-caprolactone, a $C_{1-6}$-alkyl substituted ε-caprolactone, a δ-valerolactone, a $C_{1-6}$-alkyl substituted δ-valerolactone, or mixtures thereof. Specific examples include ε-caprolactone and the 7-methyl-, 3-methyl-, 5-methyl-, 6-methyl-, 4-methyl-, 5-tetra-butyl-, 4,4,6-trimethyl- and 4,6,6-trimethyl-ε-caprolactone and δ-valerolactone. Other lactones include γ-propiolactone, γ-butyrolactone, an optionally-substituted δ-valerolactone, an optionally-substituted ε-caprolactone, a block copolymer of (ε-caprolactone and δ-valerolactone), or mixtures thereof.

The hydroxycarboxylic acid may include a hydroxy-$C_{2-20}$-alkenylene carboxylic acid, a hydroxy-$C_{1-20}$ alkylene carboxylic acid, or mixtures thereof. In one embodiment, the hydroxycarboxylic acid is a hydroxy-$C_{1-20}$ alkylene carboxylic acid, or mixtures thereof. Specific examples of suitable hydroxy carboxylic acids are ricinoleic acid, 12-hydroxystearic acid, 6-hydroxyhexanoic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactic acid and glycolic acid.

In one embodiment, Q is a repeat unit derived from an aminocarboxylic acid, a hydroxycarboxylic acid, or a lactone, or mixtures thereof, which is linked via an oxygen derived from a hydroxy group to L, and via a carboxylic group to D, or mixtures thereof.

In one embodiment, Q is derived from units linking a dicarboxylic acid to a diol. Suitable examples of a dicarboxylic acid include oxalic acid, malonic acid, succinic acid, glutaric acid, adipic acid, azelaic acid, sebacic acid, maleic acid, fumaric acid, citraconic acid, itaconic acid, cyclohexanedicarboxylic acid, phthalic acid, diglycolic acid; or anhydrides thereof, or mixtures thereof. Examples of suitable diols include butane-1,4-diol, pentane-1,5-diol, hexane-1,6-diol, ethylene glycol, propylene glycol, butylene glycol, pentylene glycol, hexylene glycol, 1,4-cyclohexanedimethanol, neopentyl glycol, thiodiglycol, oligo-alkyleneglycols, polyalkyleneglycols, or mixtures thereof.

As used herein the terms "poly-hydroxy" or "poly carboxylic acid" means a compound that contains four or more hydroxy or carboxylic acid groups.

In one embodiment, J is a mono-, di-, tri- or poly-hydroxy di-, tri- or poly-carboxylic acid residue which is linked via an oxygen of a hydroxy group to L, and via a carboxylic group to D-Q, or mixtures thereof.

Examples of a suitable mono-, di-, tri- or poly-hydroxy di-, tri- or poly-carboxylic acid include tartaric acid, malic acid, citromalic acid (2-methylmalic acid), 3-hydroxy-3-methylglutaric acid, 5-hydroxyisophthalic acid, ascorbic acid or citric acid, or mixtures thereof. In one embodiment, the poly-carboxylic acid includes malic acid (hydroxybutane dicarboxylic acid), citric acid, or mixtures thereof.

An example of a suitable poly-carboxylic acid includes hydroxy-benzene-1,2,4,5-tetracarboxylic acid.

Salts of Formula (1) may be derived from an alkali metal (such as sodium or potassium), an alkaline earth metal (such as calcium or magnesium), a transition metal (such as zinc, copper, or nickel), ammonia, an amine (such as butyl amine), an alkanolamine (such as diethanolamine), or quaternary ammonium salt.

In one embodiment, the invention provides a process to prepare the compound of Formula (1), or a compound obtained/obtainable by reacting
(a) a phosphorylating agent, or sulphating agent;
(b) at least one member of the group consisting of an amino carboxylic acid, a hydroxycarboxylic acid, a lactone, and a mono-, di-, tri- or polyhydroxy di-, tri- or poly-carboxylic acid; and
(c) an amine, wherein the amine has a functional group selected from the group consisting of (i) a mono-amino group represented by the general formula R—O—$(Y)_x$-T-N(G)-, (ii) a diamino group represented by the general formula R'—N(G')-T-O—$(Y)_x$-T-N(G)-) and mixtures thereof.

Typically, the process comprises reacting (b) and (c). The product of (b) and (c) is then reacted with sulphating agent, or a phosphorylating agent.

Any of the reactive agents of (b) may be in the form of a pre-polymer. The pre-polymer may also be used as alternatives to any of reactants in (b). Optionally and of the reactants of (b) may contain groups derived from (c).

The reaction of a lactone with an alcohol may be carried out in an inert atmosphere (such as nitrogen or argon), at a temperature in the range of 150° C. to 180° C., and optionally in the presence of an esterification catalyst. Examples of a suitable esterification catalyst include tetra-alkyl titanate, for example, tetrabutyl titanate, zinc salt of an organic acid, for example, zinc acetate, zirconium salt of an aliphatic alcohol, for example, zirconium isopropoxide, toluene sulphonic acid or a strong organic acid such as haloacetic acid, for example, trifluoroacetic acid. In one embodiment, the esterification catalyst is zirconium isopropoxide.

The reaction of (b) and (c), when (b) includes a hydroxycarboxylic acid may be carried out at a reaction temperature of 100° C. to 250° C., optionally in the presence of an esterification catalyst. Suitable esterification catalysts include dibutyl tin dilaurate, tetraalkyltitanate, p-toluenesulphonic acid or ferrous acetylacetonate.

The reaction with phosphorylating agent and/or sulphating agent may be carried out at 50° C. to 150° C., for a period of 1 hour to 24 hours. The reaction is optionally carried out in the presence of an inert solvent, such as xylene or toluene, and optionally in the presence of a catalyst. In one embodiment, no catalyst is used.

INDUSTRIAL APPLICATION

In one embodiment, the compound of Formula (1) is a dispersant.

The compound of Formula (1) in different embodiments is present in the composition of the invention in a range selected from 0.1 to 50 wt. %, or 0.25 to 35 wt. %, and 0.5 to 30 wt. %.

The particulate solid present in the composition may be any inorganic or organic solid material which is substantially insoluble in the organic medium. In one embodiment, the particulate solid is a pigment.

In one embodiment, the composition of the invention provides a paint or ink including a particulate solid, an organic liquid, a binder and a compound of Formula (1), or salts thereof.

In one embodiment, the solid is an organic pigment from any of the recognised classes of pigments described, for example, in the Third Edition of the Colour Index (1971) and subsequent revisions of, and supplements thereto, under the chapter headed "Pigments". Carbon black, although strictly inorganic, behaves more like an organic pigment in its dispersing properties.

Examples of suitable solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids, biocides, agrochemicals and pharmaceuticals which are applied as dispersions in organic solids; particulate ceramic materials; magnetic materials and magnetic recording media; fibres such as glass, steel, carbon and boron for composite materials.

Inorganic solids include: extenders and fillers such as talc, kaolin, silica, barytes and chalk, flame-retardant fillers such as alumina trihydrate, or magnesium hydroxide; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

The organic medium present in the composition of the invention in one embodiment is a plastics material and in another embodiment an organic liquid. The organic liquid may be a non-polar or a polar organic liquid, although a polar organic liquid is typically used. By the term "polar" in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Such organic liquids generally have a hydrogen bonding number of 5 or more as defined in the above mentioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids include dialkyl ketones, alkyl esters of alkane carboxylic acids and alkanols, especially such liquids containing up to, and including, a total of 6 or 8 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment, solvents are alkanols, alkane carboxylic acids and esters of alkane carboxylic acids.

Examples of organic liquids, which may be used as polar organic liquids are film-forming resins such as inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol polyoxyethylenes (or polyethylene oxides).

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic liquid includes at least 0.1% by weight, or 1% by weight or more of a polar organic liquid based on the total organic liquid.

The organic liquid optionally further includes water. In one embodiment, the organic liquid is free of water.

When the organic liquid contains water, the amount present in one embodiment is not greater than 70%, or not greater than 50%, or not greater than 40% by weight based on the amount of organic liquid.

The plastics material may be a thermoset resin or a thermoplastic resin. The thermosetting resins useful in this invention include resins which undergo a chemical reaction when heated, catalysed, or subject to UV or electron beam radiation and become relatively infusible. Typical reactions in thermosetting resins include oxidation of unsaturated double bonds, reactions involving epoxy/amine, epoxy/carbonyl, epoxy/hydroxyl, polyisocyanate/hydroxy, amino resin/hydroxy moieties, free radical reactions or polyacrylate, cationic polymerization or epoxy resins and vinyl ether, or condensation of silanol.

Polymers with hydroxy functionality (frequently polyols) are widely used in thermosetting system to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates; and their polymers. Typical aliphatic diisocyanates include hexamethylene diisocyanate, isophorone diisocyanate and hydrogenated diphenylmethane diisocyanate. Typical aromatic isocyanates include toluene diisocyanates and diphenylmethane diisocyanates.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods.

If desired, the compositions may contain other ingredients, for example, resins (where these do not already constitute the organic medium), binders, fluidising agents, anti-sedimentation agents, plasticisers, surfactants, anti-foamers, rheology modifiers, levelling agents, gloss modifiers and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either, the organic medium or the dispersant, the other ingredient or ingredients then being added and the mixture being agitated to provide the composition.

In one embodiment, the composition of the present invention is suited to liquid dispersions. In one embodiment, such dispersion compositions comprise: (a) 0.5 to 40 parts of a particulate solid, (b) 0.5 to 30 parts of a compound of Formula (1), and (c) 30 to 99 parts of an organic or aqueous medium; wherein all parts are by weight and the amounts (a)+(b)+(c)=100.

In one embodiment, component a) includes 0.5 to 40 parts of a pigment and such dispersions are useful as liquid inks, paints and mill-bases.

If a composition is required including a particulate solid and a compound of Formula (1) in dry form, the organic liquid is typically volatile so that it may be readily removed from the particulate solid by a simple separation means such as evaporation. In one embodiment the composition includes the organic liquid.

If the dry composition consists essentially of the compound of Formula (1) and the particulate solid, it typically contains at least 0.2%, at least 0.5% or at least 1.0% the compound of Formula (1) based on weight of the particulate solid. In one embodiment, the dry composition contains not greater than 50%, not greater than 20%, or not greater than 10% by weight of the compound of Formula (1) based on the weight of the particulate solid. In one embodiment, the compound of Formula (1) is present at 0.6 wt. % to 8 wt. % in the dry composition.

As disclosed hereinbefore, the compositions of the invention are suitable for preparing mill-bases wherein the particulate solid is milled in an organic liquid in the presence of a compound of Formula (1), or salts thereof.

Thus, according to a still further embodiment of the invention, there is provided a mill-base including a particulate solid, an organic liquid and a compound of Formula (1), or salts thereof.

Typically, the mill-base contains from 20 to 70% by weight particulate solid based on the total weight of the mill-base. In one embodiment, the particulate solid is not less than 10 or not less than 20% by weight of the mill-base. Such mill-bases may optionally contain a binder added either before or after milling. The binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, and natural proteins such as casein. In one embodiment, the binder is present in the composition at more than 100% based on the amount of particulate solid, more than 200%, more than 300% or more than 400%.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

The amount of dispersant in the mill-base is dependent on the amount of particulate solid but is typically from 0.5 to 5% by weight of the mill-base.

Dispersions and mill-bases made from the composition of the invention are particularly suitable for use in coatings and paints both solvent-based and water-base, especially high solids paints; inks, especially offset, flexographic, gravure, radiation-curable, and screen inks; non-aqueous ceramic processes, especially tape-coating, doctor-blade, extrusion and injection moulding type processes, composites, cosmetics, adhesives and plastics materials.

In one embodiment, the composition of the invention further includes one or more additional known dispersants.

The following examples provide illustrations of the invention. These examples are non exhaustive and are not intended to limit the scope of the invention.

EXAMPLES

Intermediate 1: Jeffamine M600 (83.89 parts 141 mmols) and caprolactone (16.11 parts, 141 mmols) are stirred under nitrogen atmosphere at 180° C. for 6 hours. The lactone carbonyl peak disappeared and an amide carbonyl peak (1649 cm$^{-1}$) is observed in the IR spectrum. A dark brown liquid (95 parts) is obtained. Base equivalent is measured as 10173.

Intermediate 2: Jeffamine M2005 (50 parts, 21 mmols) and caprolactone (2.41 parts 21 mmols) are stirred under nitrogen atmosphere in the presence of o-phosphoric acid (0.26 parts) at 150° C. for 2 hours. The lactone carbonyl peak disappeared and an amide carbonyl peak (1649 cm$^{-1}$) is observed in the IR spectrum. An amber liquid (51 parts) is obtained.

Intermediate 3: A polyetheramine of a C12-15 alcohol having on average 24 repeat units of propylene oxide (100 parts, 42 mmols) and caprolactone (4.82 parts, 42 mmols) are stirred under nitrogen atmosphere at 150° C. for 4 hours in the presence of o-phosphoric acid (0.5 parts). The lactone carbonyl peak disappeared and an amide carbonyl peak (1649 cm$^{-1}$) is observed in the IR spectrum. An amber liquid (103 parts) is obtained.

Intermediate 4: A polyetheramine of a C12-15 alcohol having on average 20 repeat units of butylene oxide (100 parts, 34 mmols) and caprolactone (3.85 parts, 34 mmols) are stirred under nitrogen atmosphere at 150° C. for 4 hours in the presence of o-phosphoric acid (0.5 parts). The lactone carbonyl peak disappeared and an amide carbonyl peak (1649 cm$^{-1}$) is observed in the IR spectrum. A dark brown liquid (102 parts) is obtained.

Intermediate 5: A polyetheramine of methoxy polyethyleneglycol MW550 (97.25 parts, 159 mmols) and caprolactone (36.27 parts, 318 mmols) are stirred under nitrogen atmosphere at 150° C. for 6 hours. The lactone carbonyl peak disappeared and an amide carbonyl peak (1649 cm$^{-1}$) is observed in the IR spectrum. A dark brown liquid (130 parts) is obtained.

Intermediate 6: Jeffamine M600 (72.24 parts, 122 mmols) and caprolactone (27.76 parts, 243 mmols) are stirred under nitrogen atmosphere at 180° C. for 6 hours. The lactone carbonyl peak disappeared and an amide carbonyl peak (1649 cm$^{-1}$) is observed in the IR spectrum. A dark brown liquid (86 parts) is obtained. Base equivalent was measured as 51032.

Intermediate 7: A vessel is charged with Intermediate 1 (66.10 parts), Citric acid (19.61 parts) and dodecylbenzenesulfonic acid (0.15 parts). The mixture is stirred at 180° C. under nitrogen for 2 hours. The product is a dark brown liquid (78.09 parts, Acid value 73.86 mg).

Intermediate 8: A vessel is charged with Jeffamine M600 (75.56 parts) and citric acid (26.73 parts). The mixture is stirred at 150° C. under nitrogen for 3 hours. The product is a dark brown liquid (93.3 parts, Base Equivalence 8719).

Intermediate 9: A vessel is charged with polyethyleneglycol monomethyl ether amino propyl ether (MW 605, ex Lubrizol, 110.9 parts) and ε-caprolactone (20.92 parts) and dodecylbenzenesulfonic acid (0.15 parts). The mixture is stirred at 180° C. under nitrogen for 6 hours. The product is a yellow liquid (125 parts).

Dispersant Example 1

Intermediate 1 (46.92 parts) and polyphosphoric acid (5.4 parts) are stirred at 100° C. for 6 hours under a nitrogen atmosphere to give a brown liquid (49.7 parts).

Dispersant Example 2

Intermediate 6 (34.8 parts) and polyphosphoric acid (3.45 parts) are stirred at 100° C. for 6 hours under a nitrogen atmosphere to give a brown liquid (35.7 parts).

The following dispersants were prepared by the method outlined for Dispersant 1 using the amounts of intermediates and polyphosphoric acid shown in the Table.

| Dispersant | Intermediate | Parts Intermediate | Parts Polyphosphoric Acid | Parts Product | Appearance of Product |
| --- | --- | --- | --- | --- | --- |
| 3 | 9 | 50 | 4.75 | 52 | Amber Liquid |
| 4 | 2 | 25 | 0.6 | 22.5 | Dark brown viscous liquid |
| 5 | 3 | 52.41 | 1.35 | 50 | Dark brown viscous liquid |
| 6 | 4 | 25 | 0.52 | 26 | Hazy brown viscous liquid |
| 7 | 5 | 60.07 | 6.29 | 63.87 | Dark brown liquid |
| 8 | 1 | 31.92 | 3.15 | 31.09 | Dark brown viscous liquid |
| 9 | 7 | 32.18 | 2.91 | 32.74 | Dark brown viscous liquid |
| 10 | 8 | 45.65 | 4.84 | 47.00 | Dark brown liquid |

Dispersion Evaluation: Crystic 196 (polyester resin in styrene, Ex Scott-Bader Co, 57.14 parts) is charged to a stainless steel mill-pot and set to stir briskly. Each example dispersant (1 part active dispersant) is added and stirred into the resin for five minutes. Omyacarb™ 10 ML (calcium carbonate, ex Omya, 100 parts) filler is added gradually until substantially all of the filler is charged. The mixture is then stirred at 3000 rpm for 15 minutes to form a paste. The paste is evaluated for viscosity.

The control sample does not contain a dispersant.

Each paste sample is measured on a TA Instruments AR2000 Controlled Stress rheometer in flow measurement mode, using a 40 mm$^{2°}$ C. at 20° C. The samples are sheared at rates of 0.3 s$^{-1}$ to 126.5 s$^{-1}$. The viscosity data (Pa s) obtained is as follows:

|  | Shear Rate (s⁻¹) | | | | | | |
| --- | --- | --- | --- | --- | --- | --- | --- |
|  | 0.3000 | 0.7114 | 1.687 | 4.001 | 9.487 | 22.50 | 53.35 |
| Control | 41.17 | 42.55 | 42.77 | 41.08 | 38.97 | 35.78 | 29.24 |
| Dispersant Example 1 | 18.55 | 19.28 | 19.86 | 19.51 | 19.02 | 18.45 | 16.13 |
| Dispersant Example 2 | 17.16 | 17.53 | 18.02 | 17.64 | 17.07 | 14.96 | 14.28 |
| Dispersant Example 3 | 26.21 | 24.77 | 23.87 | 22.25 | 21.45 | 20.78 | 19.06 |
| Dispersant Example 4 | 36.44 | 29.33 | 24.7 | 21.1 | 15.23 | 12.89 | 11.02 |
| Dispersant Example 5 | 47.93 | 35.26 | 27.21 | 22.51 | 16.54 | 14.1 | 11.73 |
| Dispersant Example 6 | 99.9 | 64.37 | 41.52 | 29.68 | 23.15 | 19.48 | 15.36 |
| Dispersant Example 7 | 15.86 | 16.02 | 16.47 | 16.29 | 16.15 | 16.29 | 16.19 |
| Dispersant Example 8 | 27.86 | 29.45 | 29.37 | 28.71 | 26.17 | 22.30 | 19.47 |
| Dispersant Example 9 | 32.82 | 33.83 | 33.61 | 32.23 | 28.39 | 23.76 | 19.27 |
| Dispersant Example 10 | 24.38 | 24.66 | 25.1 | 24.53 | 21.98 | 19.84 | 17.86 |

The data obtained from the tests indicates that the compound of the invention lowers the viscosity of the compositions comprising a particulate solid, an organic medium and a compound of Formula (1).

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A compound of Formula (1b) and salts thereof, comprising:

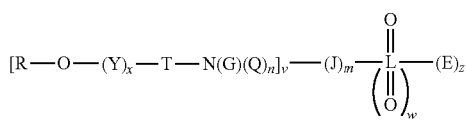

Formula (1b)

wherein
when L is sulphur, w is 1 and z is 1; or when L is phosphorus, w is 0 and z is 2;
E is —OH, or an oxygen anion when the compound of Formula (1b) is a salt;
Q is a repeat unit derived from an aminocarboxylic acid, or a hydroxycarboxylic acid, or a lactone, a residue of a dicarboxylic acid and diol, or mixtures thereof;
m is 0 or 1, with the proviso that when m is 0, v is 1, and Q is linked via an oxygen derived from a hydroxy group to L; and when m is 1, v is 1 to 4;
J is a mono-, di-, tri- or poly-hydroxy di-, tri- or poly-carboxylic acid residue, with the proviso that J is linked via a carboxylic group to Q and via an oxygen of a hydroxy group to L when m is 1;
n is 0 to 100;
R is independently $C_{1-50}$-optionally substituted hydrocarbyl, or $C_{1-50}$-optionally substituted hydrocarbonyl, or the residue of an epoxide;
Y is an alkyleneoxy group, wherein at least one Y group which is —$CH_3CH(CH_3)O$— and the chain represented by $(Y)_x$ contains up to 90 mole % ethyleneoxy repeat units;
T is an alkylene group such as $C_{2-4}$ alkylene;
G is independently H or $C_{1-50}$-optionally substituted hydrocarbyl or $C_{1-50}$-optionally substituted hydrocarbonyl; and
x is 2 to 90.

2. The compound of claim 1, wherein n is 1 to 100.

3. The compound of claim 1, wherein n is 0 to 2.

4. The compound of claim 1, wherein L is phosphorus.

5. The compound of claim 1, wherein the R—O—$(Y)_x$-T-N(G)-$(Q)_n]_v$-$(J)_m$: group of Formula (1b) has a number average molecular weight of 200 to 10,000.

6. The compound of claim 1, wherein Y is a mixture of $C_{3-4}$-alkyleneoxy where the chain represented by $(Y)_x$ is in part —$CH_2CH_2CH_2CH_2O$—, —$CH_2CH(CH_3)O$— or —$CH_2$—$CH(CH_2$—$CH_3)$—O—.

7. A composition comprising a particulate solid, an organic or aqueous medium and a compound of claim 1.

8. The composition of claim 7, wherein the compound of Formula (1b) is present at 0.1 to 50 wt. % of the composition.

9. The composition of claim 7, wherein the compound of Formula (1b) is present at a range selected from 0.25 to 35 wt. %.

10. The composition of claim 7, wherein the organic medium is an organic liquid or a plastic material.

11. The composition of claim 7, wherein the organic liquid comprises at least 0.1% by weight of a polar organic liquid based on the total organic liquid.

12. The composition of claim 7, wherein the particulate solid is a pigment or filler.

13. The composition of claim 7, wherein the compound of Formula (1b) is present at a range selected from 0.5 to 30 wt. % of the composition.

* * * * *